United States Patent
Sommer et al.

(10) Patent No.: US 6,261,358 B1
(45) Date of Patent: Jul. 17, 2001

(54) PIGMENT PREPARATIONS

(75) Inventors: Richard Sommer, Odenthal; Frank Linke, Köln; Udo Herrmann, Dormagen; Gunther Stolp, Köln, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/415,171

(22) Filed: Oct. 8, 1999

(30) Foreign Application Priority Data

Oct. 15, 1998 (DE) .............................. 198 47 586

(51) Int. Cl.$^7$ .......................... C09B 67/00; C09B 67/10; C09B 45/14; B08K 5/3462
(52) U.S. Cl. ................. 106/496; 8/466; 8/494; 524/89; 524/92; 524/100
(58) Field of Search ................. 106/496; 8/466, 8/494; 524/89, 92, 100; 534/602, 692, 752, 767, 768

(56) References Cited

U.S. PATENT DOCUMENTS

| | | | |
|---|---|---|---|
| 3,869,439 | 3/1975 | Schundehutte | 534/707 |
| 4,094,699 | 6/1978 | Fitzgerald | 106/497 |
| 4,622,391 | 11/1986 | Lorenz et al. | 534/707 |
| 4,628,082 | 12/1986 | Lorenz et al. | 534/707 |
| 5,221,334 | 6/1993 | Ma et al. | 524/167 |
| 6,077,339 | * 6/2000 | Nyssen et al. | 106/498 |

FOREIGN PATENT DOCUMENTS

| | | |
|---|---|---|
| 195 35 246 | 3/1997 | (DE) . |
| 197 12 486 | 10/1998 | (DE) . |
| 73464 | 5/1985 | (EP) . |
| 839879 | * 5/1998 | (EP) . |
| 1416076 | 12/1975 | (GB) . |

OTHER PUBLICATIONS

K. Lindner, Tenside–Textilhilfsmittel–Waschrohstoffe, $2^{nd}$ Edition, vol. 1, Wissenschaftliche Verlagsgesellschaft mbH, Stuttgart, (Month Unavailable), 1964, pp. 12–19 and 555–559.

* cited by examiner

Primary Examiner—Anthony Green

(74) Attorney, Agent, or Firm—Joseph C. Gil; Richard E.L. Henderson

(57) ABSTRACT

Solid pigment preparations comprising as pigment at least one metal complex of an azo compound which in the form of its tautomeric structures conforms to the formula (I)

$$\text{(I)}$$

[Chemical structure of formula (I) showing two rings X and Y connected by N=N azo linkage, with substituents $(R_1)_n$, $(R_2)_m$, $(R_3)_o$, $(R_4)_p$, $R_5$, and HO groups]

wherein the rings X and Y may each independently bear one or two substituents selected from the group consisting of =O, =S, =NR$_7$, —NR$_6$H$_7$, —OR$_6$, —SR$_6$, —COOR$_6$, —CN, —CONR$_6$R$_7$, —SO$_2$R$_8$, $$\begin{array}{c} -\text{N}-\text{CN}, \\ | \\ R_6 \end{array}$$

alkyl, cycloalkyl, aryl and aralkyl, the sum total of the endo- and exocyclic double bonds being three for each of the rings X and Y, R$_6$ is hydrogen, alkyl, cycloalkyl, aryl or aralkyl, R$_7$ is hydrogen, cyano, alkyl, cycloalkyl, aryl, aralkyl or acyl, R$_8$ is alkyl, cycloalkyl, aryl or aralkyl, R$_1$, R$_2$, R$_3$ and R$_4$ are each independently hydrogen, alkyl, cycloalkyl, aryl or aralkyl and furthermore, as indicated by the broken lines in the formula (I), may form 5- or 6-membered rings to which further rings may be fused, R$_5$ is —OH, —NR$_6$R$_7$, alkyl, cycloalkyl, aryl or aralkyl, the substituents mentioned for R$_1$ to R$_8$ which contain CH bonds may in turn be substituted, and m, n, o and p are each 1 or, if the ring nitrogen atoms are the starting points for double bonds, as indicated by the dotted lines in the formula (I), may also be zero, and which metal complex hosts at least one other compound as guest compound, characterized in that slurry of the solid pigment preparations with 20 times the amount of water has a pH of >6.5.

13 Claims, No Drawings

PIGMENT PREPARATIONS

The invention relates to new pigment preparations, processes for producing them and their use.

EP-A-73 463 discloses coloristically valuable pigments. These still have application disadvantages, however. For instance, pigments prepared in the manner described are very harsh in texture and have to be comminuted in relatively time-intensive dispersing processes to obtain the desired coloristics and hence the conforming particle size. Yet, such pigments still have some disadvantages in disperibility and colour strength.

It is accordingly an object of the present invention to provide new pigmentary forms free of the above-described disadvantages.

According to the invention there are provided solid pigment preparations comprising as pigment at least one metal complex of an azo compound which in the form of its tautomeric structures conforms to the formula (I)

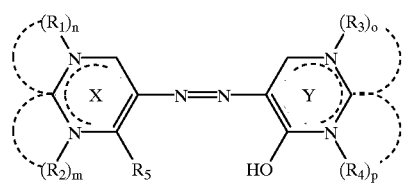

(I)

wherein
the rings X and Y may each independently bear one or two substituents selected from the group consisting of $=O$, $=S$, $=NR_7$, $-NR_6H_7$, $-OR_6$, $-SR_6$, $-COOR_6$, $-CN$,

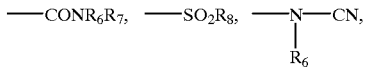

alkyl, cycloalkyl, aryl and aralkyl, the sum total of the endo- and exocyclic double bonds being three for each of the rings X and Y, $R_6$ is hydrogen, alkyl, cycloalkyl, aryl or aralkyl, $R_7$ is hydrogen, cyano, alkyl, cycloalkyl, aryl, aralkyl or acyl, $R_8$ is alkyl, cycloalkyl, aryl or aralkyl, $R_1$, $R_2$, $R_3$ and $R_4$ are each independently hydrogen, alkyl, cycloalkyl, aryl or aralkyl and furthermore, as indicated by the broken lines in the formula (I), may form 5- or 6-membered rings to which further rings may be fused, $R_5$ is $-OH$, $-NR_6R_7$, alkyl, cycloalkyl, aryl or aralkyl, the substituents mentioned for $R_1$ to $R_8$ which contain CH bonds may in turn be substituted, and m, n, o and p are each 1 or, if the ring nitrogen atoms are the starting points for double bonds, as indicated by the dotted lines in the formula (I), may also be zero, and which metal complex hosts at least one other compound as guest compound, characterized in that a slurry of the solid pigment preparations with 20 times the amount of water has a pH of >6.5.

Preferred organic metal complexes are those of azo compounds which in the form of their free acid conform to one of the tautomeric forms of the formula (I) where the X ring represents a ring of the formula

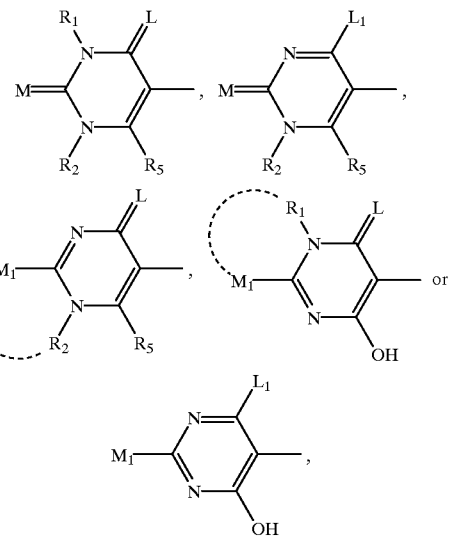

where
L and M are each independently $=O$, $=S$ or $=NR_6$,
$L_1$ is hydrogen, $-OR_6$, $-SR_6$, $-NR_6R_7$, $-COOR_6$, $-CONR_6R_7$, $-CN$, alkyl, cycloalkyl, aryl or aralkyl,
$M_1$ is $-OR_6$, $-SR_6$, $-NR_6R_7$, $-COOR_6$, $-CONR_6R_7$, $-CN$, $-SO_2R_8$,

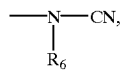

alkyl, cycloalkyl, aryl or aralkyl, and the substituents $M_1$ and $R_1$ or $M_1$ and $R_2$ may form a 5- or 6-membered ring.

Particularly preferred organic metal complexes are those of azo compounds which in the form of their free acids conform to one of their tautomeric structures of the formulae (II) or (III)

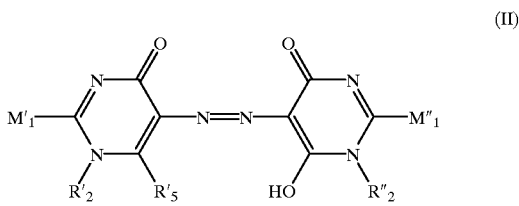

(II)

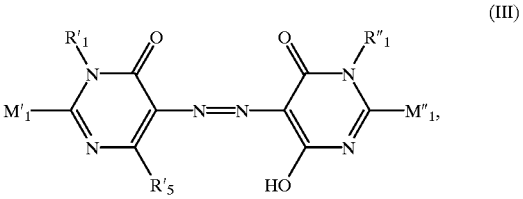

(III)

where
$R'_5$ is $-OH$ or $-NH_2$,
$R'_1$, $R''_1$, $R'_2$ and $R''_2$ are each hydrogen, and
$M'_1$ and $M''_1$ are each independently hydrogen, $-OH$, $-NH_1$, $-NHCN$, arylamino or acylamino.

Very particularly preferred metal complexes are those of azo compounds of the formula (I) which in the form of their free acid conform to one of the tautomeric structures of the formula (IV)

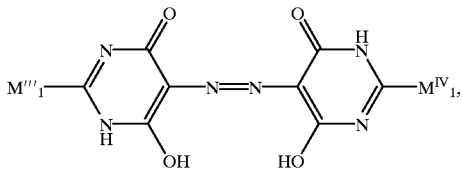
(IV)

where $M'''_1$ and $M^{IV}_1$ are independently OH or NHCN.

Preference is given especially to organic metal complexes of those azo compounds of the formula (I) which in the form of their free acid conform to one of the tautomeric structures of the formula (V)

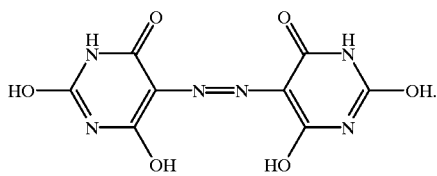
(V)

In the foregoing formulae, the substituents preferably have the following meanings:

Alkyl substituents are preferably $C_1$–$C_6$-alkyl, which may be substituted for example by halogen, such as chlorine, bromine or fluorine, —OH, —CH, —$NH_2$ or $C_1$–$C_6$-alkoxy.

Cycloalkyl substituents are preferably $C_3$–$C_7$-cycloalkyl, especially $C_5$–$C_6$-cycloalkyl, which may be substituted for example by $C_1$–$C_6$-alkyl, $C_1$–$C_6$-alkoxy, halogen such as Cl, Br or F, $C_1$–$C_6$-alkoxy, —OH, —CN or $NH_2$.

Aryl substituents are preferably phenyl or naphthyl, which may each be substituted for example by halogen such has F, Cl or Br, —OH, $C_1$–$C_6$-alkyl, $C_1$–$C_6$-alkoxy, —$NH_2$, —$NO_2$ or —CN.

Aralkyl substituents are preferably phenyl- or naphthyl-$C_1$–$C_4$-alkyl, which may be substituted in the aromatic radicals by halogen such as F, Cl or Br, —OH, $C_1$–$C_6$-alkyl, $C_1$–$C_6$-alkoxy, —$NH_2$, —$NO_2$ or —CN, for example.

Acyl substituents are preferably ($C_1$–$C_6$-alkyl)carbonyl, phenylcarbonyl, $C_1$–$C_6$-alkylsulphonyl, phenylsulphonyl, optionally $C_1$–$C_6$-alkyl-, phenyl- or naphthyl- substituted carbamoyl, optionally $C_1$–$C_6$-alkyl-, phenyl- or naphthyl-substituted sulphamoyl or optionally $C_1$–$C_6$-alkyl-, phenyl- or naphthyl-substituted guanyl, where the alkyl radicals mentioned may be substituted for example by halogen such as Cl, Br or F, —OH, —CN, —$NH_2$ or $C_1$–$C_6$-alkoxy and the phenyl and naphthyl radicals mentioned may be substituted for example by halogen such as F, Cl or Br, —OH, $C_1$–$C_6$-alkyl, $C_1$–$C_6$-alkoxy, —$NH_2$, —$NO_2$ or —CN.

If $M_1R_1$ or $M_1R_2$ or $M_1R_2$ and $R_1$, $R_2$, $R_3$, $R_4$, as indicated by the broken lines in the formula (I), form 5- or 6-membered rings, these are preferably triazole, imidazole or benzimidazole, pyrimidine or quinazoline ring systems.

Metal complexes, which is also to be understood as meaning metal salts, of the formulae (I) to (V) preferably include the salts and complexes of the mono-, di, tri- and tetraanions with the metals Li, Cs, Mg, Cd, Co, Al, Cr, Sn, Pb, particularly preferably Na, K, Ca, Sr, Ba, Zn, Fe, Ni, Cu and Mn.

Particular preference is given to salts and complexes of the formulae (I) and (V) with di- or trivalent metals, very particularly the nickel salts and complexes.

The metal complexes which contain at least one other compound, especially an organic compound, as guest can be present as host-guest compounds, intercalation compounds and also as solid solutions.

They are very particularly preferably inclusion compounds, intercalation compounds and solid solutions in which the azobarbituric acid/nickel 1:1 complex comforms to one of the tautomeric forms of the formula

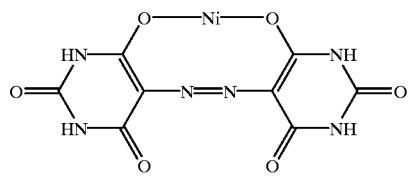
(VI)

and includes at least one other compound.

The invention further relates to metal complexes of an azo compound which in the form of its tautomeric structures conforms to the formula (V) and which contains at least one other compound as guest, characterized in that the metal complexes correspond to the mono-, di, tri- or tetraanions of the azo compounds of the formula (V) with the metals selected from the group consisting of Li, Cs, Mg, Cd, Co, Al, Cr, Sn, Pb, Na, K, Ca, Sr, Ba, Zn, Fe, Cu and Mn. The preferred included compounds are those identified hereinbelow.

In general, the metal complex forms a layered crystal lattice in which the bonding within a layer is essentially via hydrogen bonds and/or metal ions. Preferably, the metal complexes are metal complexes which form a crystal lattice which consists essentially of planar layers.

Useful metal complexes also include metal complexes in which a metal-containing compound, for example a salt or metal complex, is incorporated into the crystal lattice of the nickel complex. In this case, in the formula (VI), for example, a portion of the nickel can be replaced by other metal ions, or further metal ions can enter into a more or less pronounced interaction with the nickel complex.

Included compounds may be organic compounds and inorganic compounds. Compounds which can be included come from a very wide variety of classes of compounds. For purely practical reasons, preference is given to such compounds as are liquid or solid under normal conditions (25° C., 1 bar).

Of the liquid substances, preference is given in turn to those which have a boiling point of 100° C. or higher, preferably of not less than 150° C., at 1 bar. Suitable compounds are preferably acyclic and cyclic organic compounds, for example aliphatic and aromatic hydrocarbons, which may be substituted, for example by OH, COOH, $NH_2$, substituted $NH_2$, $CONH_2$, substituted $CONH_2$, $SO_2NH_2$, substituted $SO_2NH_2$, $SO_3H$, halogen, $NO_2$, CN, —$SO_2$-alkyl, —$SO_2$-aryl, —O-alkyl, —O-aryl, —O-acyl.

Specific examples are paraffins and paraffin oils; triisobutylene, tetraisobutylene, mixtures of aliphatic and aromatic hydrocarbons as produced in petroleum fractionation for example; chlorinated paraffin hydrocarbons such as dodecyl chloride or stearyl chloride; $C_{10}$–$C_{30}$-alcohols such as 1-decanol, 1-dodecanol, 1-hexadecanol, 1-octadecanol and their mixtures, olein alcohol, 1,12-octadecanediol, fatty acids and their salts and mixtures, for example formic acid, acetic acid, dodecanoic acid, hexadeconoic acid, octadecanoic acid, oleic acid, fatty acid esters, for example the methyl esters of $C_{10}$–$C_{20}$-fatty acids, fatty acid amides, such as stearamide, stearic acid monoethanolamide, stearic acid diethanolamide, stearonitrile, fatty amines, for example dodecylamine, cetylamine, hexadecylamine, octadecylamine and others; salts of fatty amines with sulphonic and carboxylic acids, isocyclic hydrocarbons such as cyclododecane, decahydronaphthalene, o-, m-, p-xylene, mesitylene, dodecylbenzene mixture, tetralin, naphthalene, 1-methylnaphthalene, 2-methylnaphthalene, biphenyl, diphenylmethane, acenaphthene, fluorene, anthracene, phenanthrene, m-, p-terphenyl, o-, p-dichlorobenzene, nitrobenzene, 1-chloronaphthalene, 2-chloronaphthalene, 1-nitronaphthalene, isocyclic alcohols and phenols and their derivatives such as benzyl alcohol, decahydro-2-naphthol, diphenyl ether, sulphones, for example diphenyl sulphone, methyl phenyl sulphone, 4,4'-bis-2-(hydroxyethoxy) diphenyl sulphone; isocyclic carboxylic acids and their derivatives such as benzoic acid, 3-nitrobenzoic acid, cinnamic acid, 1-naphthalenecarboxylic acid, phthalic acid, dibutyl phthalate, dioctyl phthalate, tetrachlorophthalic acid, 2-nitrobenzamide, 3-nitrobenzamide, 4-nitrobenzamide,4-chlorobenzamide, sulphonic acids, such as 2,5-dichlorobenzenesulphonic acid, 3-nitro-, 4-nitro-benzenesulphonic acid, 2,4-dimethylbenzenesulphonic acid, 1- and 2-naphthalenesulphonic acid, 5-nitro-1- and 5-nitro-2-naphthalenesulphonic acid, di-sec-butylnaphthalenesulphonic acid mixture, biphenyl-4-sulphonic acid, 1,4-, 1,5-, 2,6-, 2,7-naphthalenedisulphonic acid, 3-nitro-1,5-naphthalenedisulphonic acid, 1-anthraquinonesulphonic acid, 2-anthraquinonesulphonic acid, biphenyl-4,4'-disulphonic acid, 1,3,6-naphthalenetrisulphonic acid and the salts of these sulphonic acids e.g. the sodium, potassium, calcium, zinc, nickel and copper salts; sulphonamides such as benzenesulphonamide, 2-, 3- and 4-nitrobenzenesulphonamide, 2-, 3- and 4-chlorobenzenesulphonamide, 4-methoxybenzenesulphonamide, 3,3'-sulphonylbisbenzenesulphonamide, 4,4'-oxybisbenzenesulphonamide, 1- and 2-naphthalenesulphonamide.

Carboxamides and sulphonamides are a preferred group of compounds to be included, also suitable in particular are urea and substituted ureas such as phenylurea, dodecylurea and others and also their polycondensates with aldehydes, especially formaldehyde; heterocycles such as barbituric acid, benzimidazolone, 5-benzimidazolonesulphonic acid, 2,3-dihydroxyquinoxaline, 2,3-dihydroxyquinoxaline-6-sulphonic acid, carbazole-3,6-disulphonic acid, 2-hydroxyquinoline, 2,4-dihydroxyquinoline, caprolactam, melamine, 6-phenyl-1,3,5-triazine-2,4-diamine, 6-methyl-1, 3,5-triazine-2,4-diamine, cyanuric acid.

Preferred metal complexes contain included surface-active compounds, especially surfactants, which are known for example from K. Lindner, Tenside-Textilhilfsmittel-Waschrohstoffe, $2^{nd}$ edition, Volume I, Wissenschaftliche Verlagsgesellschaft mbH, Stuttgart, 1964. They can be anoinic, non-ionic or cationic compounds or ampholytes. Examples of suitable anionic compounds are true soaps, salts of aminocarboxylic acids, salts of lower or higher acylated aminocarboxylic acids, fatty acid sulphates, sulphates of fatty acid esters, amides etc., primary alkyl sulphates, sulphates of oxo alcohols, secondary alkyl sulphates, sulphates of esterified or etherified polyoxy compounds, sulphates of substituted polyglycol ethers (sulphated ethylene oxide adducts), sulphates of acylated or alkylated alkanolamines, sulphonates of fatty acids, their esters, amides, etc., primary alkyl sulphonates, secondary alkyl sulphonates, alkyl sulphonates with acyls attached in ester fashion, alkyl or alkylphenyl ether sulphonates, sulphonates of polycarboxylic esters, alkylbenzenesulphonates, alkylnaphthalenesulphonates, fatty aromatic sulphonates, alkylbenzimidazolesulphonates, phosphates, polyphosphates, phosphonates, phosphinates, thiosulphates, hydrosulphites, sulphinates, persulphates. Examples of suitable non-ionic compounds are esters and ethers of polyalcohols, alkyl polyglycol ethers, acyl polyglycol ethers, alkylaryl polyglycol ethers, acylated and alkylated alkanolamine polyglycol ethers. Examples of suitable cationic compounds are alkylamine salts, quaternary ammonium salts, alkylpyridinium salts, simple and quaternary imidazoline salts, alkyldiamines and alkylpolyamines, acyldiamines and acylpolyamines, acylalkanolamines, alkanolamine esters, alkyl-$OCH_2$-N-pyridinium salts, alkyl-$CO$-NH-$CH_2$-N-pyridinium salts, alkylethyleneureas, sulphonium compounds, phosphonium compounds, arsenium compounds, alkylguanidines, acyl-biguanidides. Examples of suitable ampholytes are alkylbetaines, sulphobetaines and aminocarboxylic acids. Preference is given to using non-ionic surfactants, especially the ethylene oxide addition products of fatty alcohols, fatty amines and also of octyl- or nonylphenol.

A further important group of guest compounds are natural resins and resin acids such as for example abietic acid and its conversion products and salts. Examples of such conversion products are hydrogenated, dehydrogenated and disproportionated abietic acids. These can further be dimerized, polymerized or modified by addition of maleic anhydride and fumaric acid. Also of interest are the resin acids modified at the carboxyl group such as for example the methyl, hydroxyethyl, glycol, glyceryl and pentaerythritol esters and also resin acid nitriles and resin acid amines and also dehydroabietyl alcohol.

Also suitable for inclusion are polymers, preferably water-soluble polymers, for example ethylene-propylene oxide block polymers, preferably having an $M_n$ not less than 1000, especially of 1000 to 10,000 g/mol, polyvinyl alcohol, poly(meth)-acrylic acids, modified cellulose, such as carboxymethylcelluloses, hydroxyethyl- and propylcelluloses, methyl- and ethyl-hydroxyethylcelluloses.

Other suitable guest compounds are condensation products based on

A) sulphonated aromatics,

B) aldehydes and/or ketones and optionally

C) one or more compounds selected from the group of the non-sulphonated aromatics, urea and urea derivatives.

Based on means that the condensation product was optionally prepared from other reactants besides A, B and optionally C. Preferably, however, the condensation products for the purposes of this invention are prepared only from A, B and optionally C.

The sulphonated aromatics of component A) will be understood in the context of this invention as including sulphomethylated aromatics as well. Preferred sulphonated aromatics are naphthalenesulphonic acids, phenolsulphonic acids, dihydroxybenzenesulphonic acids, sulphonated ditolyl ethers, sulphomethylated 4,4'-dihydroxydiphenyl sulphone, sulphonated diphenylmethane, sulphonated biphenyl, sulphonated hydroxybiphenyl, especially 2-hydroxybiphenyl, sulphonated terphenyl or benzenesulphonic acids.

Aldehydes and/or ketones useful as component B) include in particular aliphatic cycloaliphatic and also aromatic ones. Preference is given to aliphatic aldehydes, particularly preferably formaldehyde and other aliphatic aldehydes of 3 to 5 carbon atoms.

Examples of non-sulphonated aromatics useful as component C) are phenol, cresol, 4,4'-dihydroxydiphenyl sulphone and dihydroxydiphenylmethane.

Examples of urea derivatives are dimethylolurea, alkylureas, melamine and guanidine.

Preference is given to a condensation product based on
A) at least one sulphonated aromatic selected from the group consisting of naphthalenesulphonic acids, phenolsulphonic acids, dihydroxybenzenensulphonic acids, sulphonated ditolyl ethers, sulphomethylated 4,4'-dihydroxydiphenyl sulphone, sulphonated diphenylmethane, sulphonated biphenyl, sulphonated hydroxybiphenyl, especially 2-hydroxybiphenyl, sulphonated terphenyl and benzenesulphonic acids,
B) formaldehyde and optionally
C) one or more compounds selected from the group consisting of phenol, cresol, 4,4'-dihydroxydiphenyl sulphone, dihydroxydiphenylmethane, urea, dimethylolurea, melamine and guanidine.

Preferred condensation products are condensation products based on 4,4'-dihydroxydiphenyl sulphone, sulphonated ditolyl ether and formaldehyde; 4,4'-dihydroxydiphenyl sulphone, sodium bisulphite, formaldehyde and urea; naphthalenesulphonic acid, 4,4'dihydroxydiphenyl sulphone and formaldehyde; sulphonated terphenyl and formaldehyde; and/or sulphonated 2-hydroxybiphenyl and formaldehyde and also naphthalenesulphonic acid and formaldehyde.

Particular preference for use as guest compounds is given to melamine or melamine derivatives, especially those of the formula (VII)

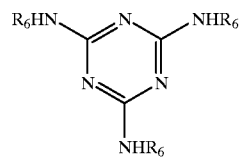

(VII)

where
R$_6$ is hydrogen or C$_1$–C$_4$-alkyl, which is optionally substituted by OH groups,
very particularly preferably where
R$_6$ is hydrogen.

The amount of substance which can be incorporated as guest compounds in the crystal lattice of the metal compounds in generally 5% to 200% by weight, especially 5 to120% by weight, based on the amount of host compound. Preference is given to a guest compound amount of 10 to 100% by weight. The amount referred to here is the amount of substance which is not washed out by suitable solvents and which is obtained from the elemental analysis. Naturally, it is also possible to add more or less than the aforementioned amount of substance, and it may be optionally dispensed with to wash an excess out. Preference is given to amounts of 10 to 150% by weight.

The pH of an aqueous slurry formed from the pigment preparation of the invention and 20 times the amount of water is preferably greater than 6.5 to 11, especially 7 to 9.

The preparations of the invention may comprise further additives. Preferred additives are organic or inorganic bases.

Suitable bases are alkali metal hydroxides, for example NaOH, KOH or organic amines such as alkylamines, especially alkanolamines or alkylalkanolamines.

Particular preference is given to methylamine, dimethylamine, trimethylamine, ethanolamine, n-propanolamine, n-butanolamine, diethanolamine, triethanolamine, methylethylanolamine or dimethylethanolamine.

Examples of further additives are dispersants, carboxamides, sulphonamides and also customary pigment preparation additives.

Dispersants for the purposes of the present invention are substances which stabilize the pigment particles in their fine particulate form in aqueous media. Finely particulate is preferably understood as meaning a fine division of 0.001 to 5 μm, especially of 0.005 to 1 μm, particularly preferably of 0.005 to 0.5 μm.

Suitable dispersants are for example anionic, cationic, amphoteric or non-ionic.

Suitable anionic dispersants are in particular condensation products of aromatic sulphonic acids with formaldehyde, such as condensation products of formaldehyde and alkylnaphthalenesulphonic acids or of formaldehyde, naphthalenesulphonic acids and/or benzenesulphonic acids, condensation products of optionally substituted phenol with formaldehyde and sodium bisulphite. Also suitable are dispersants from the group of the sulphosuccinic esters and alkylbenzenesulphonates. Also sulphated, alkoxylated fatty acid alcohols or salts thereof. Alkoxylated fatty acid alcohols are to be understood as meaning in particular those C$_6$–C$_{22}$ fatty acid alcohols which are provided with 5 to 120, preferably 5 to 60, especially with 5 to 30, ethylene oxide and are saturated or unsaturated, especially stearyl alcohol. Particular preference is given to a stearyl alcohol alkoxylated with 8 to 10 ethylene oxide units. The sulphated alkoxylated fatty acid alcohols are preferably present as salts, especially as alkali metal or amine salts, preferably as diethylamine salt. Also suitable in particular are ligninsulphonates, for example those which are obtained by the sulphite or kraft process. Preferably they are products which are partially hydrolyzed, oxidized, propoxylated, sulphonated, sulphomethylated or desulphonated and fractionated according to known processes, for example according to the molecular weight or according to the degree of sulphonation. Mixtures of sulphite and kraft ligninsulphonates are likewise very effective. Of particular suitability are ligninsulphonates having an average molecular weight between 1000 and 100,000, an active ligninsulphonate content of not less than 80% and preferably a low level of polyvalent cations. The degree of sulphonation can vary widely.

Examples of useful non-ionic dispersants are reaction products of alkylene oxides with alkylatable compounds, for example fatty alcohols, fatty amines, fatty acids, phenols, alkylphenols, arylalkylphenols, such as styrene-phenol condensates, carboxamides and resin acids. They are for example ethylene oxide adducts from the class of the reaction products of ethylene oxide with:
a1) saturated and/or unsaturated fatty alcohols of 6 to 22 carbon atoms or
b1) alkylphenols having 4 to 12 carbon atoms in the alkyl radical or
c1) saturated and/or unsaturated fatty amines of 14 to 20 carbon atoms or
d1) saturated and/or unsaturated fatty acids of 14 to 20 carbon atoms or
e1) hydrogenated or unhydrogenated resin acids.

Suitable ethylene oxide adducts are in particular the alkylatable compounds mentioned under a1) to e1) when combined with 5 to 120, especially 5 to 100, especially 5 to 60, particularly preferably 5 to 30, mol of ethylene oxide.

Suitable dispersants also include the esters of the alkoxylation product of the formula (X) known from DE-A 19 712 486, which has an earlier priority date, or from DE-A 19 535 246, which conform to the formula (XI) and also these optionally mixed together with the parent compounds of the formula (X). The alkoxylation product of a styrene-phenol condensate of the formula (X) is as hereinbelow defined:

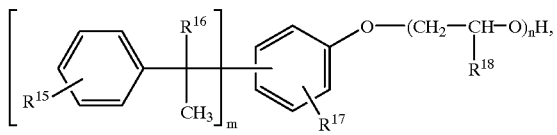

(X)

where $R^{15}$ is hydrogen or $C_1-C_4$-alkyl, $R^{16}$ is hydrogen or $CH_3$.

$R^{17}$ is hydrogen, $C_1-C_4$-alkoxy, $C_1-C_4$-alkoxycarbonyl or phenyl, m is from 1 to 4, n is from 6 to 120, $R^{18}$ is identical or different for each unit with the index n and represents hydrogen, $CH_3$ or phenyl subject to the proviso that in the case of $CH_3$ being present in the various —(—$CH_2$—$CH(R^{18})$—O—)— groups $R^{18}$ is $CH_3$ in 0 to 60% of the total value of n and is hydrogen in 100 to 40% of the total value of n and in the case of phenyl being present in the various —(—$CH_2$—CH($R^{18}$)—O—)— groups $R^{18}$ is phenyl in 0 to 40% of the total value of n and is hydrogen in 100 to 60% of the total value of n.

Esters of alkoxylation products (X) conform to the formula (XI)

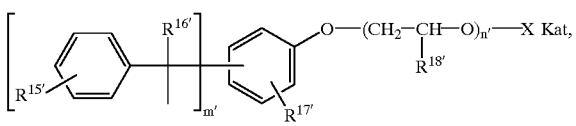

(XI)

where $R^{15'}$, $R^{16'}$, $R^{17'}$, $R^{18'}$, m' and n' assume the scope of meaning of $R^{15}$, $R^{16}$, $R^{17}$, $R^{18}$, m and n, respectively, but independently thereof.

X is —$SO_3$, —$SO_2$, —$PO_3$ or —CO—($R^{19}$)—COO,

Kat is a cation selected from the group consisting of $H^+$, $Li^+$, $Na^+$, $K^+$, $NH_4^+$ and HO—$CH_2CH_2$—$NH_3^+$, subject to the proviso that in the case of X=—$PO_3^-$ two cations are present, and $R^{19}$ is a divalent alphatic or aromatic radical, preferably $C_1-C_4$-alkylene, especially ethylene, monounsaturated $C_2-C_4$ radicals, especially acetylene, or optionally substituted phenylene, especially ortho-phenylene, preferred substituents being $C_1-C_4$-alkyl, $C_1-C_4$-alkoxycarbonyl or phenyl.

Specific individual compounds of the formula (XI) are known for example from DE-A 19 712 486 and mixtures of the formulae (X) and (XI) for example from DE 19535246 which each form part of this application.

A preferred dispersant is the compound of the formula (XI). Preferably a compound of the formula (XI) where X is a radical of the formula —CO—($R^{19}$)—COO— and $R^{19}$ is as defined above.

Preference for use as dispersant is likewise given to a compound of the formula (XI) used together with a compound of the formula (X). In this case, the dispersant preferably contains 5 to 99% by weight of the compound (XI) and 1 to 95% by weight of the compound (X).

Polymeric dispersants are for example water-soluble and also water-emulsifiable compounds, for example homo- and copolymers such as random or block copolymers.

Particularly preferred polymeric dispersants are for example AB, BAB and ABC block copolymers. In the AB or BAB block copolymers, the A segment is a hydrophobic homopolymer or copolymer which provides a bond to the pigment and the B block is a hydrophilic homopolymer or copolymer or a salt thereof and ensures dispersal of the pigment in an aqueous medium. Such polymeric dispersants and their synthesis are known for example from EP-A-518 225 and EP-A-556 649.

The dispersant is preferably used in an amount of 0.1 to 100% by weight, especially 0.5 to 60% by weight, based on the use level of pigment in the pigment preparation.

Examples of suitable carboxyamides and sulphonamides are urea and substituted ureas such as phenylurea, dodecylurea and others; heterocycles such as barbituric acid, benzimidazolone, benzimidazolone-5-sulphonic acid, 2,3-dihydroxyquinoxaline, 2,3-dihydroxyquinoxaline-6-sulphonic acid, carbazole, carbazole-3,6-disulphonic acid, 2-hydroxyquinoline, 2,4-dihydroxyquinoline, caprolactam, melamine, 6-phenyl-1,3,5-triazine-2,4-diamine, 6-methyl-1, 3,5-triazine-2,4-diamine, cyanuric acid.

The preparation of the invention preferably contains 80 to 100% by weight, especially 90 to 99.9% by weight, of the above pigment and 0 to 20% by weight, especially 0.1 to 10% by weight, of an inorganic or organic base, each based on the sum total of these two components.

In a particularly preferred embodiment, the pigment preparations of the invention contain 30 to 99.9% by weight of at least one of the above pigments, 0.1 to 20% by weight of an inorganic or organic base, and 0 to 50% by weight of a dipersant, each based on the preparation.

The preparation may contain further additives, of course. For instance, additives which reduce the viscosity of an aqueous suspension and increase the solids content, such as the abovementioned carboxamides and sulphonamides, can be added in an amount of up to 10% by weight, based on the preparation.

However, it is particularly preferable for the preparation of the invention to contain more than 90%, especially more than 95%, preferably more than 97%, by weight of pigment, base and optionally dispersant.

The invention further provides a process for preparing the pigment preparation of the invention, characterized in that a) a metal complex of an azo compound which in the form of its tautomeric structures conforms to the formula (I) and which contains at least one other compound as guest, whose slurry with 20 times the amount of water has a pH of ≦6.5, preferably of 2 to 5, b) is adjusted by addition of an inorganic and/or organic base to a pH of >6.5, the value possessed by a slurry of a), based on the dry matter of a), with 20 times the amount of water, and optionally after addition of further additives c) dried.

In a particular embodiment of the process, the starting compound used is the pigment which is obtained on complexing the azo compound of the formula (I) with the metal salt in the acidic region, preferably at pH 2 to 6.0, isolation and subsequent washing with water or water-acid mixtures, such as dilute HCl.

The pH is preferably adjusted using the following bases: $NH_3$, alkali metal hydroxides such as NaOH, KOH and LiOH, organic amines such as alkylamines, especially alkanolamines or alkylalkanolamines. Particular preference is given to methylamine, dimethylamine, triethylamine, ethanolamine, diethanolamine, triethanolamine, methylethanolamine, dimethylethanolamine and also $NH_3$.

The base is preferably used in such an amount as to provide a pH of greater than 6.5 to 14 for a slurry of a), based on the dry matter of a), with 20 times the amount of water. If a base is used which is not volatile during the subsequent drying such as alkali metal hydroxide or organic amine, the pH is preferably greater than 6.5 to 11, particularly preferably 7 to 9, especially 7 to 8.5.

If, by contrast, a base is used which is volatile during the subsequent drying, preferably ammonia, which can be used as an aqueous ammonia solution, then it is advantageous to set a pH of 7 to 14.

It is also possible to use volatile and nonvolatile bases together. In this case, the amount of the base which is not volatile during the drying is preferably chosen so that it is capable of setting a pH of preferably 7 to 9. The amount of the base which is volatile during the drying, preferably $NH_3$, is preferably chosen in such a way that using it is possible to set a pH of up to pH=14.

The preferably aqueous slurry obtained following addition of the base and optionally further additives preferably has a solids content of 10 to 40% by weight, especially 15 to 30% by weight.

If further additives are to be used, they are preferably added prior to drying. Examples thereof include the above-mentioned ingredients for the preparation of the invention.

Suitable dryers for the drying c) include in principle all dryers, for example vacuum dryers, through-circulation dryers, especially spray dryers, especially one- and two-material and also rotary disc dryers. Fluidized bed drying processes are also possible.

Examples of suitable single-material nozzle dryers are those having a spiral chamber nozzle.

In a very particularly preferred embodiment of the process of the invention, the base used is ammonia optionally together with further bases which are not volatile during the drying and the resultant aqueous slurry, preferably having a solids content of 5 to 40% by weight, is spray-dried. This embodiment of the process of the invention leads to particularly advantageous granules, distinguished by very good dispersibility, colour strength and brilliance to the substrate. In addition, they are free-flowing and extremely low-dust.

Inclusion compounds, intercalation compounds and solid solutions of the metal compounds per se are known in the literature. They and their preparation are described for example in EP 0 074 515 and EP 0 073 463. The products obtained by the production processes described therein however, are harsh-textured and difficult-to-disperse forms, making their use as pigments very difficult.

The preparations of these compounds as described for example EP 0 073 464 takes the form of the syntheses of the azo compound being followed by complexing with a metal salt and thereafter, with or without intermediate isolation of the metal complex, by the reaction with the compound to be intercalated. In the case of the industrially useful metal complexes which contain at least one other compound as guest, the di- and trivalent metals, especially the technically and economically important intercalation compound of the azobarbituric acid-nickel complex, the complexing and intercalation and also the subsequent isolation take place in the acidic pH range.

However, the drying of the products thus produced will usually, and regardless of the drying conditions, produce very harsh-textured and difficult-to-disperse pigments, which frequently do not possess the desired colour strength either. The problem of harsh texture and dispersibility arises in particular also in the case of the industrially useful intercalation compounds of the azobarbituric acid-nickel complex and here to a very particular degree in the case of the intercalation compound with melamine, which has appreciable significance both technically and economically.

It is known to improve the harsh texture, dispersibility and colour strength of pigments by various methods. Such processes are known for example from DE-A-2 214 700, DE-A-2 064 093 and DE-A-2 753 357.

But all these methods are very complicated and, what is more, frequently lead to losses in the space-time yield. The application of some of these methods to the intercalation compounds of the metal complexes of the azo compounds of the formula (I) fails in some instances because these pigments are not stable under the conditions of the aftertreatment, as in the case of the pasting from mineral acids.

It has now been found, completely surprisingly, that the pigment preparations of the invention are appreciably softer in texture and very much better dispersible. In addition, substrates pigmented therewith have a comparatively higher colour strength and also a higher brilliance.

Likewise preferred pigment preparations are those which, in an alkyd/melamine resin system according to DIN 53 238 Part 31, following a dispersing time of just 2 hours, have a colour strength which is not less than 3%, preferably more than 10%, particularly more than 20% higher than that of the pigment whose slurry with 20 times the amount of water has a pH of <6.5, following a conforming dispersing time of 2.5 and 2 hours, respectively.

The solid pigment preparations are very useful for all pigment applications.

They are useful for example for pigmenting varnishes of all kinds for the production of printing colours, distemper colours or binder colours, for the mass coloration of synthetic, demisynthetic or natural macromolecular substances, especially polyvinyl chloride, polystyrene, polyamide, polyethylene or polypropylene, and for the spin-dyeing of natural, regenerated or artificial fibres, for example cellulose, polyester, polycarbonate, polyacrylonitrile or polyamide fibres, and also for printing textiles and paper. These pigments provide finely divided, stable, aqueous pigmentations of emulsion and paint colours which are useful for paper coloration, for the pigment printing of textiles, for laminating and also for the spin-dyeing of viscose, by grinding or kneading in the presence of non-ionic, anionic or cationic surfactants.

EXAMPLES

Example 1

Comparative Example Analogous to EP-A-73 463

Preparation of the melamine intercalation compound of the azobarbituric acid-nickel complex 0.1 mol of water-moist paste of the sodium salt of azobarbituric acid is homogeneously suspended in 500 ml of distilled water using a laboratory stirrer and heated to 95° C. 0.105 mol of a 24% strength aqueous solution of nickel chloride·6 $H_2O$ is added dropwise. The batch is stirred for 30 minutes for laking. 0.2 mol of melamine is added, and the batch is stirred until the intercalation reaction has ended. A pH of 5 is set using sodium hydroxide solution, and the product is filtered off and washed electrolyte-free. The result is a water-moist paste having a solids content of 43%.

Example 2

The water-moist paste prepared according to Example 1 is dried at 80° C. in a vacuum drying cabinet and ground for about 2 minutes in a customary laboratory mill. A slurry with 20 times the amount of water is found to have a pH of $\leq 6$.

Example 3

186 g of water-moist paste of a melamine intercalation compound of the azobarbituric acid-nickel complex prepared according to Example 1 are homogeneously stirred up with 814 ml of distilled water using a laboratory stirrer, heated to 80° C. and adjusted to pH 7.0 to 7.5 with about 1.3 g of N'N-dimethylethanolamine and stirred at that pH and 80° C. for 2 h. This is followed by isolation on a suction filter, drying in a vacuum drying cabinet at 80° C. and grinding for about 2 minutes in a customary laboratory mill. A slurry with 20 times the amount of water is found to have a pH of >7.

The pigment thus obtained is evaluated in a white paint drawdown. To this end, the pigment is incorporated in an alkyd/melamine resin system in accordance with the directions of DIN 53 238 Part 31.

After a dispersing time of one hour, the paint drawdown of this pigment has a 3.7% higher colour strength than the paint drawdown after a dispersing time of 2.5 hours under the above conditions of the pigment obtained according to Example 2.

Example 4

186 g of water-moist paste of a melamine intercalation compound of the azobarbituric acid-nickel complex prepared according to Example 1 are homogeneously suspended in 814 ml of distilled water using a laboratory stirrer, heated to 80° C. and adjusted to pH 8.5 with about 4.0 g of ethanolamine and stirred at that pH and 80° C. for 2 h. Thereafter, the pigment is isolated on a suction filter, dried at 80° C. in a vacuum drying cabinet and ground for about 2 minutes in a customary laboratory mill. A slurry with 20 times the amount of water is found to have a pH of >7.

The pigment thus obtained was dispersed in an aqueous binder system. Compared with the pigment of Example 2, the drawdown of the pigment of this example has a 12.5% higher colour strength.

Example 5

186 g of water-moist paste according to Example 1 are homogeneously suspended in 814 ml of distilled water using a laboratory stirrer, heated to 80° C. and adjusted to pH 8.5 with about 1.8 g of 40% strength sodium hydroxide solution and stirred at that pH and 80° c. for 2 h. Thereafter, the pigment is isolated on a suction filter, dried at 80° C. in a vacuum drying cabinet and ground for about 5 minutes in a customary laboratory mill. A slurry with 20 times the amount of water is found to have a pH of >7.

The pigment thus obtained was dispersed in an aqueous binder system. Compared with the pigment of Example 2, the drawdown of the pigment of this example has a 12.5% higher colour strength.

Example 6

18.6 kg of water-moist paste having a solids content of 39% (conforming to 8.0 kg in the dry state) of a melamine intercalation compound of the azobarbituric acid-nickel complex prepared according to Example 1 are homogeneously suspended in 20.2 kg of distilled water and 6.4 kg of aqueous ammonia solution having an $NH_3$ content of 25% by weight at room temperature using a high speed stirrer in the course of 6 hours.

This is followed by spray drying to a residual moisture content of 2% from a two-material nozzle dryer having an inlet temperature of 180° C. and an outlet temperature of 80° C. A yellowish-brown powder is obtained. A 5 per cent strength slurry of this pigment in water has a pH of 7.5

Dispersing as described in Example 3 but preparing paint drawdowns after dispersing times of 10, 20, 30, 60 and 150 minutes and using the same scheme to disperse the spray-dried pigment of Example 2, the following colour strengths are obtained:

TABLE

| t (min) | relative colour strength of pigment | |
|---|---|---|
| | of Ex. 2 | of Ex. 6 |
| 10 | — | 87% |
| 20 | — | 97% |
| 30 | — | 104% |
| 60 | 100% | 112% |
| 150 | — | 128% |

In this comparison, the 60 minutes' dispersing of the pigment of Example 2 was set as standard. Not only is the colour strength increased, but the dispersing times required for the product spray-dried from ammoniacal slurry are significantly shorter than with the conventionally isolated and dried starting material (of Example 2).

Example 7

Example 6 is repeated using a one-material nozzle dryer. A virtually dust-free, free-flowing brown granular product is obtained. A 5 per cent strength slurry of this granular product is distilled water has a pH of about 7.5.

On dispersing as described in Example 6, the following relative colour strength are obtained by comparison with the pigment of Example 2:

TABLE relative colour strength of pigment

| t (min) | of Ex. 2 | of Ex. 7 |
|---|---|---|
| 10 | — | 87% |
| 20 | — | 94% |
| 30 | — | 100% |
| 60 | 100% | 108% |
| 150 | — | 132% |

Example 8

18.6 kg of water-moist paste according to Example 1 are homogeneously stirred up with 15 kg of distilled water, 6.4 kg of ammonia solution having an $NH_3$ content of 25% by weight and 0.12 kg of ε-caprolactam at room temperature using a high speed stirrer in the course of 6 hours. This is followed by drying as in Example 7.

A 5 per cent strength slurry of this granular product in distilled water has a pH of about 7.0.

On dispersing as described in Example 4 but preparing drawdowns after dispersing times of 10, 20, 30, 60 and 150 minutes and using the same method to disperse the spray-dried pigment of Example 2, the following colour strengths are obtained:

TABLE relative colour strength of pigment

| t (min) | of Ex. 2 | of Ex. 8 |
|---|---|---|
| 10 | — | 116% |
| 20 | — | 117% |
| 30 | — | 117% |
| 60 | 100% | 117% |
| 150 | — | 118% |

Example 9

18.6 kg of water-moist paste according to Example 1 are homogeneously stirred up with 12.9 kg of distilled water, 6.4 kg of ammonia solution having an $NH_3$ content of 25% by weight, 0.12 kg of ε-caprolactam and 0.13 kg of ethanolamine at room temperature using a high speed stirrer in the course of 6 hours. This is followed by drying to a residual moisture content of about 2% from a one-material nozzle dryer having an inlet temperature of 130° C. and an outlet temperature of 60° C. This provides a virtually dust-free, free-flowing brown granular product.

A 5 percent strength slurry of this granular product in distilled water has a pH of about 8.8.

On dispersing as described in Example 8 and comparing the dispersing curves obtained with those of the pigment of Example 2, the following colour strength values are obtained:

TABLE relative colour strength of pigment

| t (min) | of Ex. 2 | of Ex. 9 |
|---|---|---|
| 10 | — | 118% |
| 20 | — | 118% |
| 30 | — | 118% |
| 60 | 100% | 119% |
| 150 | — | 119% |

Example 10

18.6 kg of water-moist paste according to Example 1 are homogeneously stirred up with 18.8 kg of distilled water, 1.6 kg of ammonia solution having an $NH_3$ content of 25% by weight, 0.12 kg of ε-caprolactam and 0.13 kg of diethanolamine at room temperature using a high speed stirrer in the course of 6 hours. This is followed by drying to a residual moisture content of about 2% from a one-material nozzle dryer having an inlet temperature of 180° C. and an outlet temperature of 80° C. This provides a virtually dust-free, free-flowing brown granular product.

A 5 percent strength slurry of this granular product in distilled water has a pH of about 8.4.

On dispersing as described in Example 6 and comparing the colour strengths obtained with those of the pigment of Example 2, the following colour strength values are obtained:

TABLE relative colour strength of pigment

| t (min) | of Ex. 2 | of Ex. 10 |
|---|---|---|
| 10 | — | 105% |
| 20 | — | 125% |
| 30 | — | 129% |
| 60 | 100% | 133% |
| 150 | — | 140% |

Example 11

18.6 kg of water-moist paste according to Example 1 are homogeneously stirred up with 18.8 kg of distilled water, 1.6 kg of ammonia solution having an $MH_3$ content of 25% by weight, 0.12 kg of ε-caprolactam and 0.13 kg of ethanolamine at room temperature using a high speed stirrer in the course of 6 hours. This is followed by drying to a residual moisture content of about 2% from a one-material nozzle dryer having an inlet temperature of 130° C. and an outlet temperature of 60° C. This provides a virtually dust-free, free-flowing brown granular product.

A 5 percent strength slurry of this granular product in distilled water has a pH of about 8.8.

On dispersing as described in Example 6 and comparing the colour strength obtained with those of the pigment of Example 2, the following colour strength values are obtained:

TABLE

| t (min) | relative colour strength of pigment of Ex. 2 | of Ex. 11 |
|---|---|---|
| 10 | — | 110% |
| 20 | — | 120% |
| 30 | — | 127% |
| 60 | 100% | 137% |
| 150 | — | 138% |

Example 12

18.6 kg of water-moist paste according to Example 1 are homogeneously stirred up with 12.9 kg of distilled water, 6.4 kg of ammonia solution having an $NH_3$ content of 25% by weight, 0.12 kg of ε-caprolactam and 0.10 kg of dimethylethanolamine at room temperature using a high speed stirrer in the course of 6 hours. This is followed by drying to a residual moisture content of about 2% from a one-material nozzle dryer having an inlet temperature of 180° C. and an outlet temperature of 80° C. This provides a virtually dust-free, free-flowing brown granular product.

A 5 percent strength slurry of this granular product in distilled water has a pH of about 8.3.

On dispersing as described in Example 8 and comparing the colour strength obtained with those of the pigment of Example 2, the following colour strength values are obtained:

TABLE

| t (min) | relative colour strength of pigment of Ex. 2 | of Ex. 12 |
|---|---|---|
| 10 | — | 111% |
| 20 | — | 112% |
| 30 | — | 112% |
| 60 | 100% | 113% |
| 150 | — | 113% |

Example 13

18.6 kg of water-moist paste according to Example 1 are homogeneously stirred up with 16.0 kg of distilled water, 6.4 kg of ammonia solution having an $NH_3$ content of 25% by weight and 0.10 kg of dimethylethanolamine at room temperature using a high speed stirrer in the course of 6 hours. This is followed by drying to a residual moisture content of about 2% from a one-material nozzle dryer having an inlet temperature of 180° C. and an outlet temperature of 80° C. This provides a virtually dust-free, free-flowing brown granular product.

A 5 percent strength slurry of this granular product in distilled water has a pH of about 8.3.

On dispersing as described in Example 6 and comparing the colour strengths obtained with those of the pigment of Example 2, the following colour strength values are obtained:

TABLE

| t (min) | relative colour strength of Ex. 2 | of Ex. 13 |
|---|---|---|
| 10 | — | 101% |
| 20 | — | 116% |
| 30 | — | 128% |
| 60 | 100% | 136% |
| 150 | — | 138% |

Use Example

The outstanding suitability of the pigment preparations of Examples 3 to 13 according to the invention for the pulp coloration of paper was tested by the following method:
a) Preparing the paper raw material:
A laboratory hollander was used to grind a pulp mixture consisting of
70% by weight of bleached eucalyptus pulp
30% by weight of bleached pine sulphate pulp
at a consistency of 3% in tap water to a freeness of 25° SR.
b) Sheet formation and coloration:
In a dyeing beaker (1000 ml), 2.5 g of the above-ground fibre (solids) were with constant stirring diluted in 600 ml of tap water and admired with 30% by weight of titanium dioxide pigment (Bayertitan® R-PL-1, Bayer AG) based on fibre solids, in the form of a 10% strength by weight aqueous dispersion. After stirring for 10 min, the amount of each pigment preparation (see below) required for achieving ⅟25 standard depth of shade (DIN 54000) was added, followed after further stirring for 5 min by 5% by weight of Nadavin® DHF, Bayer AG, based on fibre. If necessary, the pH was adjusted to 6.5–7.0 after a further 10 min.
Sheet formation was carried out on a Rapid-Köthen® system and the sheet was then dried in a drying cabinet at about 95° C. over about 8 min.
The amount required of each pigment preparation for ⅟25 standard depth of shade was determined by means of the above-described process by measuring the colour strength difference on a Macbeth Color Eye 7000 against a coloristically equivalent textile swatch (⅟25 standard depth of shade) whose colour strength was set at 100%.
After the amount of each pigment preparation required for ⅟25 standarddepth of shade was determined, analogous step solutions were prepared on a laboratory paper machine in accordance with the abovementioned recipes.
These coloured base papers were tested for lightfastness (DIN 54004), and styrene and plasticizer (dibutyl phthalate) fastness. The assessment took place 24 hours after immersion of the coloured paper strips with regard to bleeding and any staining of the solution.
Similarly, the acid fastness (10% strength sulphuric acid) and alkali fastness (10% strength sodium carbonate solution) were tested by allowing a drop of the respective solution to act on the dyed paper for 1 min, removing the excess by means of filter paper and assessing the papers in the moist state.
The use of the pigment preparations of the invention produced very strong, brilliant colourings having excellent fastness properties.

The pigment preparations of Examples 3 to 13 according to the invention were also particularly useful for colouring so-called decorative laminate papers of the type used for producing decorative laminates.

For instance, base papers each produced as described above were each coated with a 50% strength aqueous melamine formaldehyde solution to a resin content of about 56%, precured in a continuous drying cabinet process at 120° C. to a residual moisture content of about 4–6% by weight over 2.5 min and pressed on a high pressure press at various temperatures from 150 to 180° C. and a pressure of 10 N/mm² for 5 min to form a laminate.

The laminate construct consisted of:

| | | |
|---|---|---|
| 1 | press platen, chromed, | |
| 2 | low pigmented underlay papers (impregnated with melamine resin) | |
| 2 | soda kraft papers (impregnated with phenolic resin) | |
| 1 | decorative paper pigmented according to the invention (as per Examples 3–13) | |
| 1 | press platen, chromed | |

The (decorative) papers pigmented according to the invention proved to be satisfactorily pressable within the reported temperature range and produced laminates of high brilliance and colour strength. No shift in hue was observed on pressing at 150° C. and 180° C.

What is claimed is:

1. A solid pigment preparation comprising
  (a) a pigment comprising at least one metal complex of an azo compound conforming to the formula (I)

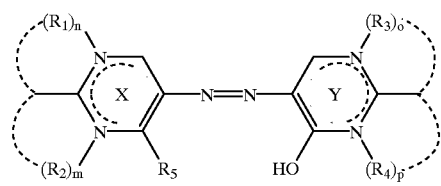

(I)

or a tautomeric form thereof,
wherein
  rings X and Y independently are optionally substituted with one or two substituents selected from the group consisting of =O, =S, =NR$_7$, —NR$_6$H$_7$, —OR$_6$, —SR$_6$, —COOR$_6$,

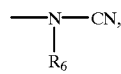

—CN, —CONR$_6$R$_7$, —SO$_2$R$_8$, alkyl, cycloalkyl, aryl, and aralkyl,
  the dotted lines in each of the rings X and Y optionally represent one or two double bonds such that the total number of endocyclic and exocyclic double bonds is three for each of the rings X and Y,
  R$_1$, R$_2$, R$_3$, and R$_4$ are independently hydrogen, alkyl, cycloalkyl, aryl, or aralkyl, or R$_1$ and R$_2$ together and/or R$_3$ and R$_4$ together form 5- or 6-membered rings, as indicated by the broken lines, to which further rings are optionally fused,
  m, n, o, and p are 1 when the corresponding ring nitrogen atom is not part of a double bond or are zero when the corresponding ring nitrogen atom is part of a double bond, as indicated by the dotted lines,
  R$_5$ is —OH, —NR$_6$R$_7$, alkyl, cycloalkyl, aryl, or aralkyl,
  R$_6$ is hydrogen, alkyl, cycloalkyl, aryl, or aralkyl, R$_7$ is hydrogen, cyano, alkyl, cycloalkyl, aryl, aralkyl, or acyl,
  R$_8$ is alkyl, cycloalkyl, aryl or aralkyl, with the proviso that R$_1$ to R$_8$ are optionally further substituted by replacing the hydrogen atom of a CH group, and
  (b) about 5% to about 200% by weight, relative to the metal complex, of at least one guest compound hosted within the metal complex, wherein said solid pigment preparation is characterized by exhibiting a pH greater than 6.5 when slurried with 20 times the quantity of water.

2. A solid pigment preparation according to claim 1 wherein the X ring represents a ring of the formula

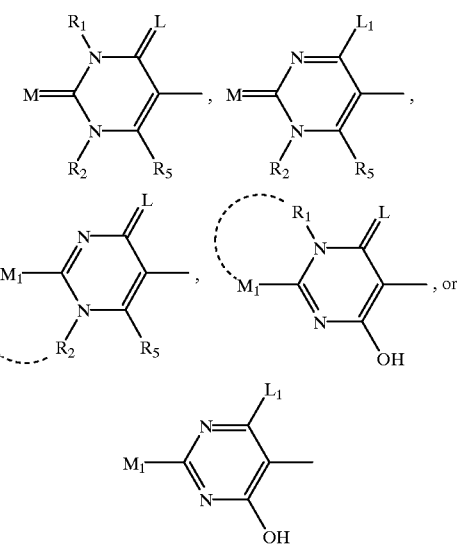

wherein
  L and M are each independently =O, =S, or =NR$_6$,
  L$_1$ is hydrogen, —OR$_6$, —SR$_6$, —NR$_6$R$_7$, —COOR$_6$, —CONR$_6$R$_7$, —CN, alkyl, cycloalkyl, aryl, or aralkyl,
  R$_1$ and R$_2$ are independently hydrogen, alkyl, cycloalkyl, aryl, or aralkyl,
  R$_5$ is —OH, —NR$_6$R$_7$, alkyl, cycloalkyl, aryl, or aralkyl,
  R$_6$ is hydrogen, alkyl, cycloalkyl, aryl, or aralkyl,
  R$_7$ is hydrogen, cyano, alkyl, cycloalkyl, aryl, or aralkyl, acyl, and
  M$_1$ is —OR$_6$, —SR$_6$, —NR$_6$R$_7$, —COOR$_6$, —CONR$_6$R$_7$, —CN, —SO$_2$R$_8$,

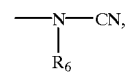

alkyl, cycloalkyl, aryl, or aralkyl, or M$_1$ and R$_1$ together or M$_1$ and R$_2$ together form a 5- or 6-membered ring, as indicated by the broken lines.

3. A solid pigment preparation according to claim 1 wherein the azo compound of the formula (I) conforms to formula (II) or (III)

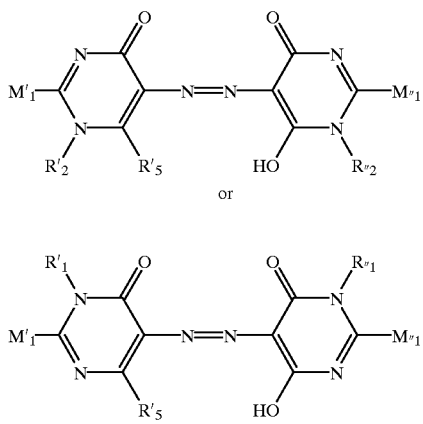

or a tautomeric form thereof
wherein
R'₅ is —OH or —NH₂,
R'₁, R"₁, R'₂, and R"₂ are each hydrogen, and M'₁, and M"₁ are independently hydrogen, —OH, —NH₂, —NHCN, arylamino, or acylamino.

4. A solid pigment preparation according to claim 1 wherein the azo compound of the formula (I) conforms to the formula (V)

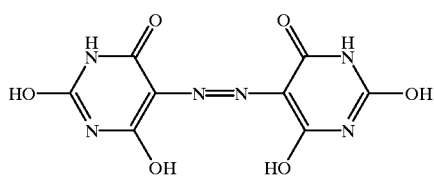

or a tautomeric form thereof.

5. A solid pigment preparation according to claim 1 wherein the metal complex is a complex of a monoanion, dianion, trianion, or tetraanion of an azo compound conforming to formula (I) with a metal selected from the group consisting of Li, Cs Mg, Cd, Co, Al, Cr, Sn, Pb, Na, K, Ca, Sr, Ba, Zn, Fe, Ni, Cu, and Mn.

6. A solid pigment preparation according to claim 1 wherein the metal complex is a Ni salt or complex of the azo compound of the formula (I).

7. A solid pigment preparation according to claim 1 wherein the guest compound is melamine.

8. A solid pigment preparation according to claim 1 characterized by exhibiting a pH of 7 to 9 when slurried with 20 times the quantity of water.

9. A process for preparing a pigment preparation according to claim 1 comprising (a) forming a mixture of a metal complex of an azo compound conforming to the formula (I) and at least one guest compound, wherein said mixture is characterized by exhibiting a pH no greater than 6.5 when slurried with 20 times the quantity of water, (b) adding an inorganic and/or organic base to the mixture to obtain a pH of greater than 6.5 and optionally adding further additives, and (c) drying the resultant pigment preparation.

10. A method for preparing printing colors, distemper colors, or binder colors comprising adding a pigment preparation according to claim 1 to a varnish.

11. A method for mass coloring synthetic, semisynthetic, or natural macromolecular substances comprising introducing a pigment preparation according to claim 1 into a synthetic, semisynthetic, or natural macromolecular substance.

12. A method for spin-dyeing natural, regenerated, or artificial fibers comprising applying a dye composition containing a pigment preparation according to claim 1 to a natural, regenerated, or artificial fiber during the fiber spinning process.

13. A method for printing textiles or paper comprising applying a printing preparation containing a pigment preparation according to claim 1 to a textile or paper.

* * * * *